United States Patent Office 3,037,037
Patented May 29, 1962

3,037,037
ORGANOPHOSPHORUS, ARSENIC, ANTIMONY DERIVATIVES OF MANGANESE CARBONYL COMPOUNDS
Ronald S. Nyholm, London, England, assignor to Ethyl Corporation, New York, N.Y., a corporation of Delaware
No Drawing. Filed Apr. 5, 1960, Ser. No. 20,001
19 Claims. (Cl. 260—429)

This invention relates to novel and useful organomanganese compounds and to methods for their preparation.

Recent years have seen a considerable volume of research on derivatives of manganese pentacarbonyl dimer. The scope of this work has been limited by the difficulty of replacing carbonyl groups from the dimer under controlled conditions. Indeed, it has not been found possible hitherto to replace even half of the carbonyl groups with other ligands. In accordance with the present invention this has now been accomplished by the use of certain special types of ligands which can be used to replace as many as eight carbonyl groups from manganese pentacarbonyl dimer and thereby produce valuable new substances useful in the chemical and allied arts, e.g., as antiknock additives, as fuel dyes and as catalysts. In fact, in some embodiments of this invention all of the carbonyl groups can be displaced from manganese pentacarbonyl dimer while leaving as products novel compounds having valuable properties.

Accordingly, this invention has as its principal object the provision of novel and useful chemical compounds and of methods for their preparation. Other objects will become apparent from the ensuing description.

The compounds of this invention are organophosphorus, -arsenic and -antimony derivatives of manganese carbonyl compounds in which a plurality of carbonyl groups have been displaced from manganese pentacarbonyl dimer by special ligands, each of which contains a plurality of P, As or Sb atoms. Thus, the use of these special ligands provides the art for the first time with a method for the controlled, stepwise displacement of carbonyl groups from manganese pentacarbonyl dimer under conditions such that a series of novel and especially valuable manganese-containing compounds are formed.

In one of its forms this invention provides compounds of the general formula $$[Mn(CO)_aL]_n$$

wherein L is a ligand composed of carbon, hydrogen and two, three or four atoms of phosphorus, arsenic or antimony, each of these atoms being connected to at least one other of these atoms by means of a hydrocarbon group of such structure that there are two or three carbons separating the group V–A element atoms thus connected; "$n$" is one or two; and "$a$" is an integer (viz., one, two or three) such that the sum of "$a$" and of the number of said atoms in said ligands is five.

Thus, a variety of ligands can be used in the practice of this invention. Specifically, these ligands can contain two, three or four atoms of the above-mentioned elements of group V–A of the periodic system.

It will also be noted from the above formula that "$n$" can be one or two, i.e., that the above compounds of this invention exist in two discrete chemical forms. In one form they are monomers, in another, dimers. This behavior is quite unusual and is just one of the particular features of the compounds of this invention. In practice, it is usually most convenient to prepare the monomer from the dimer by either recrystallization from an appropriate solvent or by heating the dimer to a temperature sufficient to cause depolymerization. Without desiring to be bound by any theory, it is believed that in these heating and recrystallization operations, the manganese-manganese bond of the dimer is ruptured with consequent formation of stable monomeric entities.

Where the ligand contains two atoms of the group V–A element the product of this invention is represented by the general formula $$[Mn(CO)_3D]_n$$

where D is a ligand composed of carbon, hydrogen and two atoms of phosphorus, arsenic or antimony, these atoms being separated by a chain of two to three carbon atoms; and "$n$" is one or two. Examples of this preferred embodiment are monomeric o-phenylenebisdimethylarsine manganese tricarbonyl and the corresponding dimer.

Another preferred embodiment is a compound of the general formula $$[Mn(CO)_2T]_n$$

wherein T is a ligand composed of carbon, hydrogen and three atoms of one of the above group V–A elements, each of the group V–A atoms being connected to at least one of the others by a chain of two to three carbon atoms, "$n$" being one or two. Monomeric and dimeric 1,7-bisdimethylarsine-4-methylarsaheptane manganese dicarbonyl are examples of this type of compound.

When the ligand contains four group V–A atoms arranged as described above, a total of eight carbonyl groups are displaced thereby from manganese pentacarbonyl dimer. Hence, still another preferred embodiment of this invention is a compound represented by the general formula $$[Mn(CO)Q]_n$$

wherein Q contains carbon, hydrogen and four atoms of one of the above group V–A elements, each atom of which is connected to at least one other such atom by a hydrocarbon chain of two to three carbon atoms, "$n$" being one or two. Examples of this embodiment are the monomers and dimers of 1,11-bis-dimethylarsino-4.8-di(methylarsa)-undecane manganese carbonyl and of 1,7-bis-dimethylarsino - 4 - (3' - dimethylarsinopropyl)arsaheptane manganese carbonyl.

All of the foregoing compounds can be made in accordance with this invention by reacting manganese pentacarbonyl dimer with the appropriate ligand compound. This reaction is carried out at a temperature sufficient to cause displacement of carbon monoxide from manganese pentacarbonyl dimer and the replacement thereof by the ligand compound.

Such a ligand compound is a chemical compound capable both of independent existence and of existence as a component (ligand) of another chemical compound. Examples of such ligand compounds include, among others, o-phenylenebisdimethylarsine,
o-phenylenebisdimethylphosphine,
1,7-bis-dimethylstibino-4-methyl-stibaheptane, and
1,11-bis-dimethylarsino-4,8-di(methylarsa)undecane.

In the above-described process, it is preferred to use as ligand compounds those which contain up to about thirty carbon atoms in the molecule, although compounds containing as many as fifty or more carbon atoms can be used in some instances. The most particularly preferred compounds contain up to about eighteen carbon atoms. The chief feature of these ligand compounds is that they are composed of carbon, hydrogen and two, three or four atoms of phosphorus, arsenic or antimony, the arrangement of these atoms being such that they are separated by two or three carbon atoms of a hydrocarbon chain. The chain separating these atoms can be a divalent aliphatic hydrocarbon group of appropriate length—e.g., ethylene, propylene, 2-methylpropylene, etc—or it can be a portion of a cyclic hydrocarbon ring—e.g., the 1,2- or 1,2,3-carbon atoms of a phenyl, cyclohexyl, or similar group.

Other examples of these ligand compounds are:

o-Phenylenebisdi-n-butylphosphine, $$1,2\text{-}C_6H_4[P(n\text{-}C_4H_9)_2]_2$$

o-Phenylenebisdi-n-propylstibine, $$1,2\text{-}C_6H_4[Sb(n\text{-}C_3H_7)_2]_2$$

o-Phenylenebisdi-n-decylarsine, $$1,2\text{-}C_6H_4[As(n\text{-}C_{10}H_{21})_2]_2$$

1,2-diphosphinoethane, $$H_2P\text{—}CH_2\text{—}CH_2\text{—}PH_2$$

1,7-bis-di-n-propylarsino-4-n-propylarsaheptane, $$(C_3H_7)_2As(CH_2)_3As(C_3H_7)(CH_2)_3As(C_3H_7)_2$$

o-Phenylenebisdi-isohexylstibine, $$1,2\text{-}C_6H_4[Sb(i\text{-}C_6H_{13})_2]_2$$

1,7-bisdi-n-decylarsino-4-n-decylarsaheptane, $$(C_{10}H_{21})_2As(CH_2)_3As(C_{10}H_{21})(CH_2)_3As(C_{10}H_{21})_2$$

1-ethyl-3,4-phenylenebisdiethylstibine, $$1\text{-}C_2H_5\text{-}3,4\text{-}C_6H_3[Sb(C_2H_5)_2]_2$$

1,11-bisdi-n-propylarsino-4,8-di(n-propylarsa)undecane, $$(C_3H_7)_2As(CH_2)_3As(C_3H_7)(CH_2)_3As(C_3H_7)$$
$$(CH_2)_3As(C_3H_7)_2$$

1,5-bisdi-n-octylphosphino-3-n-octylphosphapentane, $$(C_8H_{17})_2P(CH_2)_2P(C_8H_{17})(CH_2)_2P(C_8H_{17})_2$$

1,8-bisdi-n-decylstibino-3,6-di(n-decylstiba)octane, $$(C_{10}H_{21})_2Sb(CH_2)_2Sb(C_{10}H_{21})$$
$$(CH_2)_2Sb(C_{10}H_{21})(CH_2)_2Sb(C_{10}H_{21})_2$$

1,7-bisdiethylphosphino-4-ethylphosphaheptane, $$(C_2H_5)_2P(CH_2)_3P(C_2H_5)(CH_2)_3P(C_2H_5)_2$$

1-propyl-3,4-phenylenebisdipropylphosphine, $$1\text{-}C_3H_7\text{-}3,4\text{-}C_6H_3[P(C_3H_7)_2]_2$$

1,7-bisdi-n-hexylstibino-4-n-hexylstibaheptane, $$(C_6H_{13})_2Sb(CH_2)_3Sb(C_6H_{13})(CH_2)_3Sb(C_6H_{13})_2$$

1-n-decyl-3,4-phenylenebisdi-n-decylphosphine, $$1\text{-}C_{10}H_{21}\text{-}3,4\text{-}C_6H_3[P(C_{10}H_{21})_2]_2$$

1,7 - bis - diethylstibino-4-(3'-diethylstibinopropyl)-stibaheptane, $$[(C_2H_5)_2Sb(CH_2)_3]_3Sb$$

Another aspect of the present invention is the discovery that the foregoing compounds can be reacted with fluorine, chlorine, bromine or iodine to form novel halogen-containing compounds useful in the arts. The characteristics of the compounds, of course, depend on the particular ligands employed. Accordingly, another preferred embodiment of this invention is a compound represented by the general formula $$Mn(CO)_a(X)_bD$$

where D is a ligand of the type described above containing two group V–A atoms, X is halogen, $a$ is two or three, $b$ is one or two and $a$ plus $b$ equals four. Examples of these compounds are o-phenylenebisdimethylarsine manganese tricarbonyl monoiodide and o-phenylenebisdimethylarsine manganese dicarbonyl dibromide. Compounds of this type can also be obtained by halogen exchange. For example, one may shake o-phenylenebis-dimethylarsine manganese dicarbonyl dibromide with silver chloride or silver iodide and thereby replace the bromine, wholly or in part, with chlorine or iodine.

Another preferred embodiment of this invention is compounds of the general formula $$MnDX_3$$

where D is a ligand containing two group V–A atoms as described above and X is halogen. An example of this type of compound is o-phenylenebisdimethylarsine manganese trichloride. Compounds of this type are prepared by reacting o-phenylenebisdimethylarsine manganese tricarbonyl and like compounds of the formula $$[Mn(CO)_3D]_n$$

with halogen, especially with chlorine. It is thus evident that the use of appropriate reaction sequences of this invention will result in the complete elimination of the carbon monoxide from the original manganese pentacarbonyl dimer.

Still another embodiment of this invention is a compound represented by the general formula $$Mn(CO)_c(X)_dT$$

wherein T and X are as defined above, $c$ is one or two, $d$ is one or two, and $c$ plus $d$ equal three. Examples of this embodiment are 1,7-bis-dimethylarsino-4-methylarsaheptane manganese dicarbonyl monoiodide and 1,7-bis-dimethylarsino-4-methylarsaheptane manganese carbonyl dibromide.

A further embodiment of this invention is a compound represented by the general formula $$Mn(CO)(X)Q$$

where in X and Q are as defined above. It is seen that this is a special case where only one molecule of carbon monoxide remains in the compound. Examples of this embodiment are the 1,11-bisdimethylarsino-4,8-di(methylarsa)undecane manganese carbonyl monohalides such as the monoiodide.

In all of the foregoing embodiments of this invention the ligand compounds most perferably are arsenic-containing compounds.

The following examples in which all parts and percentages are by weight illustrate the preparation of the compounds of this invention.

*Example I*

Ten parts of manganese pentacarbonyl dimer and 15 parts of o-phenylenebisdimethylarsine were weighed into a Carius tube which was then evacuated and sealed. The contents of the tube were heated at 130° C. for four hours. After cooling, the tube was carefully opened and the product was washed with dry petroleum naphtha a number of times. The pale yellow crystalline compound, dimeric o-phenylenebisdimethylarsine manganese tricarbonyl (20 parts) was dried in vacuo and melted at 192° C. (Found: C 36.9, H 3.9, As 34.0, Mn 12.6 percent. Molecular weight in 0.38 percent solution in benzene, 780. Required: C 36.7, H 3.8, As 35.3, Mn 12.9 percent. Molecular weight 850.) The compound is readily soluble in chloroform and acetone, sparingly soluble in benzene and insoluble in petroleum naphtha. On recrystallization from chloroform it changes over to the monomer. In nitromethane the complex is virtually a nonelectrolyte, the molecular conductivity in $1.2 \times 10^{-3}$ molar solution being 7.2 mho. Magnetic susceptibility: in powder form the compound is diamagnetic;

$$\chi_g = -0.42 \times 10^{-6}$$

at 22.9° C. In Nujol mull, the infrared spectrum shows two absorption peaks (C—O stretching vibration) at 1957 and 1860 cm.$^{-1}$. In carbon disulfide solution, the compound shows three bands at 1944, 1927 and 1885 cm.$^{-1}$.

*Example II*

A sample of dimeric o-phenylenebisdimethylarsine manganese tricarbonyl, prepared as in Example I, was dissolved in chloroform and recrystallized therefrom. This procedure resulted in the conversion of the dimer to monomeric o-phenylenebisdimethylarsine manganese tricarbonyl. Monomeric o-phenylenebisdimethylarsine manganese tricarbonyl is a fairly stable compound, which can be stored and subjected to chemical reaction without the need for special precautions. However, care should be taken to avoid excessive contact with air, especially moist air.

o-Phenylenebisdimethylarsine manganese tricarbonyl monomer melted with slight decomposition at 170° C. (Found: C 37.1, H 3.9, As 35.1, Mn 12.75 percent. Molecular weight, cryoscopic in 0.43 percent solution in benzene, 401. Required: C 36.7, H 3.8, As 35.3, Mn 12.9 percent. Molecular weight, 425.) The compound is relatively insoluble in petroleum naphtha, slightly soluble in benzene and readily soluble in chloroform, acetone and nitromethane.

The compound is virtually a nonelectrolyte in nitromethane ($\lambda_m=8.9$ mho in $1.9\times10^{-3}$ M solution). Magnetic susceptibility of the powder at 24.6° is $$\chi_g = 2.54\times10^{-6}, \quad \chi_m = 1080\times10^{-6}$$

diamagnetic correction, $209\times10^{-6}$, whence $\mu_{eff}=1.76$ Bohr magnetons. In carbon disulfide solution the compound shows absorption peaks (C—O stretching vibration) in the infrared spectrum at 1965 and 1918 cm.$^{-1}$.

*Example III*

The compound of Example II was also prepared by an alternate procedure. In particular, manganese carbonyl dimer (1 part) was heated with excess o-phenylenebisdimethylarsine (2 parts) in the same manner as described in Example I, but at a higher temperature (160° C.) for a longer period of time (6 hours). The properties of the resultant product, monomeric o-phenylenebisdimethylarsine manganese tricarbonyl, are given in Example II.

*Example IV*

Twenty parts of manganese pentacarbonyl dimer, dissolved in sixty parts of benzene is treated with forty parts of 1,7-bis-dimethylarsino-4-methylarsaheptane dissolved in one hundred parts of petroleum naphtha, and the solution is heated for three hours under reflux in an atmosphere of carbon dioxide. The cooled solution is filtered and the filtrate is evaporated at room temperature under gentle vacuum. The crystalline precipitate is the dimer of 1,7-bisdimethylarsino - 4 - methylarsaheptane manganese dicarbonyl.

*Example V*

Freshly prepared dimeric o-phenylenebisdimethylarsine manganese tricarbonyl (1 part), dissolved in chloroform (100 parts), was treated with iodine (0.3 part) in chloroform (25 parts) with constant stirring. There was no evolution of gas. Decolorization of iodine took place immediately. After most of the solvent had been pumped off, dry petroleum naphtha was added in excess and the compound was allowed to crystallize. The yellow sparkling crystalline compound (0.45 part), o-phenylenebisdimethylarsine manganese carbonyl monoiodide, was washed thoroughly with dry petroleum ether and then dried in vacuo. (Found: I 23.8, Mn 9.7 percent. Required: I 23.0, Mn 9.96 percent.) It changes over quickly to a reddish-brown compound resembling copper turnings. The yellow substance is readily soluble in benzene, chloroform, acetone and nitrobenzene but practically insoluble in petroleum naphtha and water. On heating it decomposes at 200° C. The compound is diamagnetic in powder form ($\chi_g=-0.51\times10^{-6}$ at 21.5° C.). It is virtually a nonelectrolyte in nitrobenzene ($\lambda_m=2.1$ mho in $1.16\times10^{-3}$ molar solution) and monomeric in the same solvent. The compound in chloroform solution shows three peaks (C—O stretching vibration) in the infrared spectrum at 2032, 1957, 1905 cm.$^{-1}$.

*Example VI*

Freshly prepared dimeric o-phenylenebisdimethylarsine manganese tricarbonyl (0.5 part), dissolved in chloroform (50 parts), was treated with bromine (0.2 part) in carbon tetrachloride (50 parts) with constant stirring and a bright yellow microcrystalline compound separated out. The product, o-phenylenebisdimethylarsine manganese dicarbonyl dibromide (0.4 part), was filtered off under dry nitrogen and washed thoroughly with petroleum naphtha before being dried in vacuo. (Found: C 25.3, H 3.5, Br 29.4, Mn 10.1 percent. Required: C. 25.8, H 2.9, Br 28.7, Mn 9.9 percent.) The product dissolves in chloroform, acetone and nitrobenzene, is sparingly soluble in benzene and carbon tetrachloride and insoluble in petroleum naphtha and water. On heating it decomposes at 202° C. Magnetic susceptibility of the powder at 20° C. is $\chi_g=3.59\times10^{-6}$, $\chi_m=2000\times10^{-6}$, diamagnetic correction=$265\times10^{-6}$, whence $\mu_{eff}=2.3$ Bohr magnetons. In nitrobenzene the complex is practically a nonelectrolyte, the molecular conductivity in $0.96\times10^{-2}$ molar solution being 1.8 mho. It is monomeric in the same solvent. The compound in Nujol suspension shows two absorption peaks (C—O stretching vibration) in the infrared spectrum at 1958 and 1905 cm.$^{-1}$.

*Example VII*

Forty-two parts of o-phenylenebisdimethylarsine manganese tricarbonyl, dissolved in 300 parts of dry chloroform, is treated with excess gaseous chlorine at room temperature until no more is absorbed. Dry air is bubbled through the mixture to remove the excess chlorine. The mixture is filtered and the residue is washed three times with dry chloroform and dried by evacuation. The product is o-phenylenebisdimethylarsine manganese trichloride.

*Example VIII*

Fifty parts of 1,7-bis-dimethylarsino-4-methylarsaheptane manganese dicarbonyl dissolved in 300 parts of dry chloroform is treated with 15 parts of iodine dissolved in 50 parts of dry chloroform. The mixture is heated to 50° C. for three hours. The chloroform and excess iodine are removed by distillation under reduced pressure. The residue is 1,7-bis-dimethylarsino - 4 - methylarsaheptane manganese dicarbonyl monoiodide.

*Example IX*

Fifty parts of 1,7-bis-dimethylarsino-4-methylarsaheptane manganese dicarbonyl dissolved in 300 parts of dry chloroform is treated with 20 parts of bromine dissolved in 50 parts of chloroform. The mixture is heated to 50° C. for three hours. The chloroform and excess bromine are removed by distillation under reduced pressure. The residue is 1,7-bis-dimethylarsino-4-methylarsaheptane manganese carbonyl dibromide.

*Example X*

Fifty-one parts of 1,7-bis-(dimethylarsino)-4-(3'-dimethylarsinopropylarsa)-heptane, dissolved in 400 parts of dry chloroform, is heated for six hours under reflux with 20 parts of manganese pentacarbonyl dimer, the upper end of the reflux condenser being protected by a drying tube filled with soda lime. The solution is evaporated to incipient crystallization, cooled in ice and filtered. The residue is washed three times on the filter with small portions of cold chloroform and dried. The product is dimeric 1,7-bis-(dimethylarsino) - 4 - (3'-dimethylarsinopropylarsa)-heptane manganese monocarbonyl, having the formula:

[Mn(CO)As(CH$_2$CH$_2$CH$_2$As(CH$_3$)$_2$)$_3$]$_2$

*Example XI*

Twenty parts of manganese pentacarbonyl dimer dissolved in 60 parts of benzene is treated with 38 parts of o-phenylenebisdimethylstibine dissolved in 100 parts of light petroleum, and the solution is heated for five hours under reflux in an atmosphere of carbon dioxide. The preparation is completed as in Example IV. The crystalline product is the dimer of o-phenylenebisdimethylstibine manganese tricarbonyl.

Example XII

The procedure of Example XI is repeated except that the o-phenylenebisdimethylstibine is replaced by 53 parts of 1,7-bisdimethylstibino-4-methylstibaheptane. The crystalline product is the dimer of 1,7-bisdimethylstibino-4-methylstibaheptane manganese dicarbonyl.

Example XIII

The procedure of Example III is repeated except that the o-phenylenebisdimethylarsine is replaced by two parts of o-phenylenebisdimethylphosphine. The product is the monomeric o-phenylenebisdimethylphosphine manganese tricarbonyl.

Example XIV

Manganese pentacarbonyl dimer (1 part) is heated with excess 1-ethyl-3,4-phenylenebisdimethylphosphine (2 parts) in the manner described in Example I for o-phenylenebisdimethylarsine, but at a higher temperature (160° C.) and for a longer period of time (10 hours). The product is 1-ethyl-3,4-phenylenebisdimethylphosphine manganese tricarbonyl,

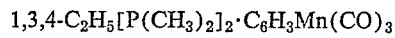

$$1,3,4\text{-}C_2H_5[P(CH_3)_2]_2\cdot C_6H_3Mn(CO)_3$$

Example XV

Freshly prepared o-phenylenebisdimethylstibine manganese tricarbonyl, as obtained in Example XI (1 part), dissolved in chloroform (100 parts) is reacted with iodine (0.3 part) in chloroform (25 parts) with constant stirring. Decolorization of iodine occurs rapidly without gas evolution. After most of the solvent has been pumped off, dry petroleum naphtha is added in excess and the compound is allowed to crystallize. The product is o-phenylenebisdimethylstibine manganese tricarbonyl monoiodide.

Example XVI

Freshly prepared 1-ethyl-3,4-phenylenebisdimethylarsine manganese tricarbonyl (prepared after the manner of Example III) (6.5 part), dissolved in chloroform (50 parts), is treated with bromine (0.2 part) in carbon tetrachloride (50 parts) with constant stirring. A microcrystalline product separates out which consists of 1-ethyl-3,4-phenylenebisdimethylarsine manganese dicarbonyl dibromide. This is filtered off under dry nitrogen, washed thoroughly with petroleum naphtha, and dried in vacuo.

Examples XVII to XXVII, Inclusive

These examples are summarized in the following table.

required for specific reactions to go to completion varies with the composition of the reacting compounds and depends also upon the other reaction conditions, such, for example, as the ratio of reactants selected, and the use of solvents, inert protective atmospheres and catalysts.

The reaction for the synthesis of the compositions of this invention may be carried out in the absence of any solvent and at elevated temperature and pressure in a sealed tube or autoclave or it may be carried out at atmospheric pressure under reflux using a pure or mixed solvent. The reactants are generally soluble in non-hydroxylic organic solvents and these are satisfactory solvents for the reactions of the invention. Specifically, simple aromatic solvents such as benzene, xylene or ethyl benzene, simple chloroalkanes such as chloroform and other solvents such as carbon tetrachloride and carbon bisulfide are found to be satisfactory.

The temperature which will cause carbon monoxide evolution in the synthesis of the nonhalogenated compounds of this invention depends in general upon the thermal stabilities of the reactants and products and can range from the boiling point of the solvent to 160° C. or above if no solvent is used. The reaction pressures are, in general, either atmospheric or the autogenous pressure corresponding to the chosen reaction temperature.

The duration of the reaction may vary in accordance with the reactants from three to six or more hours. The preferred ratios of the reactants are approximately stoichiometric but the proportions can vary from a 100 percent or greater excess of the manganese carbonyl to a 100 percent or greater excess of the ligand. As indicated above, the evolution of carbon monoxide may be taken as a criterion of the sufficiency both of the reaction temperature and of the reaction time, and the eventual cessation of carbon monoxide evolution as an indication that the reaction is complete.

As shown in the above examples, the preparation of the halogen-containing compounds of this invention can be carried out under a fairly wide range of operating conditions.

For example, any of the non-halogen-containing compounds of this invention and any of the halogens can be used. In general, the lower the atomic weight of the halogen, the greater its activity, and, consequently, the greater the extent to which it displaces carbon monoxide from the unhalogenated compound.

The proportions of the reactants in the halogenation

| Example | Reactant I | Reactant II | Product |
|---|---|---|---|
| XVII | o-Phenylenebisdimethylphosphine manganese tricarbonyl. | SbF$_5$ | o-Phenylenebisdimethylphosphine manganese dicarbonyl difluoride. |
| XVIII | ......do...... | I$_2$ | o-Phenylenebisdimethylphosphine manganese tricarbonyl iodide. |
| XIX | o-Phenylenebisdimethylstibine manganese tricarbonyl. | Cl$_2$ | o-Phenylenebisdimethylstibine manganese trichloride. |
| XX | ......do...... | Br$_2$ | o-Phenylenebisdimethylstibine manganese dicarbonyl dibromide. |
| XXI | Manganese pentacarbonyl dimer. | 1,7-Bis-dimethylphosphino-4-methylphosphaheptane. | 1,7-Bis-dimethylphosphino-4-methylphosphaheptane manganese dicarbonyl dimer. |
| XXII | 1,7-Bis-dimethylphosphino-4-methylphosphaheptane dicarbonyl dimer. | Cl$_2$ | 1,7-Bis-dimethylphosphino-4-methylphosphaheptane manganese dicarbonyl monochloride. |
| XXIII | 1,7-Bis-dimethylarsino-4-methylarsaheptane manganese dicarbonyl dimer. | Br$_2$ | 1,7-Bis-dimethylarsino-4-methylarsaheptane manganese dicarbonyl monobromide |
| XXIV | Manganese pentacarbonyl dimer. | o-Phenylenebisdimethylarsine. | o-Phenylenebisdimethylarsine manganese tricarbonyl. |
| XXV | ......do...... | 1,2-Diarsinoethane. | 1,2-Diarsinoethane manganese tricarbonyl. |
| XXVI | 1,2-Diarsinoethane manganese tricarbonyl. | I$_2$ | 1,2-Diarsinoethane manganese tricarbonyl iodide. |
| XXVII | 1,3-Bis-(methylphenylphosphine) propane. | Cl$_2$ | 1,3-Bis-(methylphenylphosphine) propane manganese trichloride. |

It is seen from the above examples that, in the formation of the halogen-free compounds of this invention, reaction is caused to occur between manganese pentacarbonyl dimer and the appropriate ligand compounds. Carbon monoxide is evolved during this reaction, and this evolution serves both as an indication that reaction is actually occurring and as a measure of the completeness of the reaction at any time. The time and temperature reactions generally correspond fairly closely to the stoichiometry involved, but an excess of halogen can be used, in accordance with the law of mass action, to drive the reaction to completion. Similarly, although atmospheric pressure is generally preferred, higher halogen pressures, of the order of ten to one hundred atmospheres or more can be used to shift the reaction equilibrium in the desired direction.

In those reactions in which gas evolution occurs, the reaction temperature is chosen high enough to bring about such evolution. Generally, a temperature of 25° C. is preferred, but higher temperatures are required in certain instances.

The halogenation can be carried out in the absence of a solvent, but proceeds more smoothly if a solvent is used. Preferred solvents, because of their relative inertness to halogen, are chlorinated hydrocarbons, such as chloroform and carbon tetrachloride.

The reactions can be carried out in an atmosphere of any gas inert both to the reactants and to the products. The preferred atmosphere is carbon dioxide gas but nitrogen, argon or hydrocarbon vapor is found to give satisfactory results.

The methods for the preparation of the ligands employed herein are described in the literature: See, for example, Barclay and Nyholm, Chemistry and Industry, 1953, 378. Methods have also been described for the preparation of manganese pentacarbonyl dimer, e.g., U.S. Patent 2,880,066, Closson, Ecke and Buzbee to Ethyl Corporation, March 21, 1959.

The compounds of this invention are generally soluble in highly-aromatic modern gasolines, to which they impart antiknock properties. The amounts to be employed depend upon the nature of the fuel and upon the operating conditions under which the latter is to be used. In general, amounts of the order of 0.005 to 0.25 percent by weight of the fuel are satisfactory.

A particular advantage of the use of these compounds as antiknock agents is that they combine in a single molecule both antiknock and antiwear effects. In other words, the phosphorus, arsenic or antimony content of the compounds of this invention exerts a beneficial, wear-inhibiting effect during engine operation. Consequently, the fact that the phosphorus, arsenic or antimony is a component of the manganese-containing compound insures that it will be carried into the combustion chamber of the engine without separation from the manganese. In this way a constant ratio of the manganese to the group V–A element is attained. Furthermore, because the compounds of this invention contain varying ratios of group V–A element to manganese, e.g., two, three or four, depending upon the compound used, the ratio of these components introduced into the engine can be varied by varying the proportions of the various compounds in the fuel.

Some of the compounds described herein have sufficient tinctorial power to be used as fuel dyes and when so used the intensity of the color of the finished fuel may be taken as a measure of the contribution of the compounds of this invention to the octane rating of the fuel. Moreover, those compounds of the invention which contain combined carbon monoxide can be employed as catalysts in the Oxo process for the manufacture of alcohols and aldehydes.

I claim:
1. A compound represented by the general formula

$$[Mn(CO)_aL]_n$$

wherein L is a non-heterocyclic ligand composed of carbon, hydrogen and from two to four atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected, $a$ is an integer such that the sum of $a$ and of the number of said atoms in L is five, and $n$ is an integer from one to two.

2. A compound represented by the general formula $$[Mn(CO)_3D]_n$$

wherein D is a non-heterocyclic ligand composed of carbon, hydrogen and two atoms of an element of group V–A of the periodic system having an atomic number from 15 to 51, inclusive, said atoms being connected by a linear hydrocarbon group such that there are from two to three carbon atoms separating said atoms; and $n$ is an integer from one to two.

3. Monomeric o-phenylenebisdimethylarsine manganese tricarbonyl.

4. Dimeric o-phenylenebisdimethylarsine manganese tricarbonyl.

5. A compound represented by the general formula $$[Mn(CO)_2T]_n$$

wherein T is a non-heterocyclic ligand composed of carbon, hydrogen and three atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected; and $n$ is an integer from one to two.

6. Dimeric 1,7 - bis - dimethylarsine - 4 - methylarsaheptane manganese dicarbonyl.

7. A compound represented by the general formula $$[Mn(CO)Q]_n$$

wherein Q is a non-heterocyclic ligand composed of carbon, hydrogen and four atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected; and $n$ is an integer from one to two.

8. Dimeric 1,7 - bis - dimethylarsino - 4 - (3'-dimethylarsinopropyl)-arsaheptane manganese carbonyl.

9. A compound represented by the general formula $$Mn(CO)_a(X)_bD$$

wherein D is a non-heterocyclic ligand composed of carbon, hydrogen and two atoms of an element of group V–A of the periodic system having an atomic number from 15 to 51, inclusive, said atoms being connected by a linear hydrocarbon group such that there are from two to three carbon atoms separating said atoms; X is halogen having an atomic number from 9 to 53, inclusive; $a$ is an integer from two to three, $b$ is an integer from one to two, and the sum of $a$ and $b$ is four.

10. o-Phenylenebisdimethylarsine manganese tricarbonyl monoiodide.

11. o-Phenylenebisdimethylarsine manganese dicarbonyl dibromide.

12. A compound represented by the general formula $$MnDX_3$$

wherein D is a non-heterocyclic ligand composed of carbon, hydrogen and two atoms of an element of group V–A of the periodic system having an atomic number from 15 to 51, inclusive, said atoms being connected by a linear hydrocarbon group such that there are from two to three carbon atoms separating said atoms; and X is halogen having an atomic number from 9 to 53, inclusive.

13. An o-phenylenebisdimethylarsine manganese trihalide wherein the halogen has an atomic number from 9 to 53, inclusive.

14. o-Phenylenebisdimethylarsine manganese trichloride.

15. A compound represented by the general formula $$Mn(CO)_c(X)_dT$$

wherein T is a non-heterocyclic ligand composed of carbon, hydrogen and three atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected; X is halogen having an atomic number from 9 to 53, inclusive; and $c$ and $d$ are finite integers whose sum is three.

16. 1,7-bis-dimethylarsino - 4 - methylarsaheptane manganese dicarbonyl monoiodide.

17. 1,7-bis-dimethylarsino - 4 - methylarsaheptane manganese carbonyl dibromide.

18. A compound represented by the general formula $$Mn(CO)(X)Q$$

wherein Q is a non-heterocyclic ligand composed of carbon, hydrogen and four atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected; and X is halogen having an atomic number from 9 to 53, inclusive.

19. The method of preparing the compounds of claim 1 which comprises reacting manganese pentacarbonyl dimer with a non-heterocyclic compound composed of carbon, hydrogen and from two to four atoms of an element of group V–A of the periodic system having an atomic number from 15 to 51, inclusive, each of said atoms being connected to at least one other of said atoms, each connection consisting of a linear hydrocarbon group such that there are from two to three carbons separating the group V–A atoms so connected.

References Cited in the file of this patent

UNITED STATES PATENTS

| | | |
|---|---|---|
| 2,818,416 | Brown et al. | Dec. 31, 1957 |
| 2,902,489 | Coffield et al. | Sept. 1, 1959 |
| 2,922,819 | Chatt et al. | Jan. 26, 1960 |

OTHER REFERENCES

Chatt et al. (II): "Chemistry and Industry," vol. 58, April 29, 1949, pages 402–404.

Abel et al.: "Journal of the Chemical Society" (London), July 1959, pages 2323–2327.

Allison et al.: "Journal of the Chemical Society" (London), November 1949, pages 2915–2921.